May 28, 1957 H. FRIEDMAN 2,794,127
DEVICE FOR MEASURING FIBER DIFFRACTION PATTERNS
Filed May 20, 1955 3 Sheets-Sheet 1
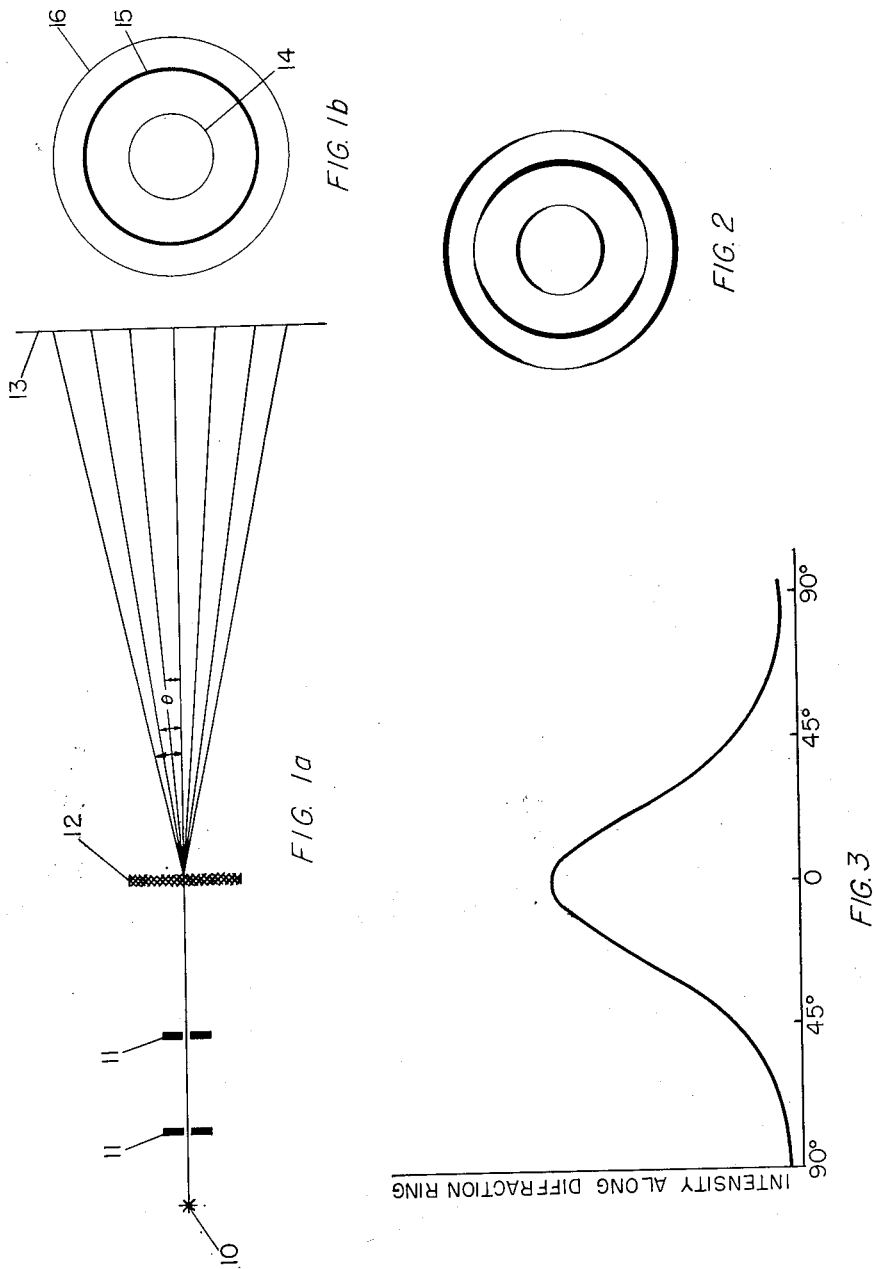
INVENTOR.
HERBERT FRIEDMAN
BY
ATTORNEY.

*INVENTOR.*
HERBERT FRIEDMAN
BY
*ATTORNEY.*

May 28, 1957 H. FRIEDMAN 2,794,127
DEVICE FOR MEASURING FIBER DIFFRACTION PATTERNS
Filed May 20, 1955 3 Sheets-Sheet 3

INVENTOR.
HERBERT FRIEDMAN
BY
ATTORNEY.

United States Patent Office 2,794,127
Patented May 28, 1957

2,794,127

DEVICE FOR MEASURING FIBER DIFFRACTION PATTERNS

Herbert Friedman, Arlington, Va., assignor, by mesne assignments, to J. J. Maguire, trading as J. J. Maguire Company, Washington, D. C.

Application May 20, 1955, Serial No. 509,707

16 Claims. (Cl. 250—51)

This invention relates to an X-ray device for determining fiber orientation by measuring diffraction patterns produced by directing X-rays through a bundle of fibers.

A conventional method of determining fiber orientation in a sample bundle of fibers is to direct X-rays in a beam at the fiber bundle and by means of a photographic film to obtain a diffraction pattern. Microphotometer means are then employed to measure the density variations of the blackened rings on the exposed film. The degree of density variations along each of the diffraction rings is then an indication of the fiber orientation.

This invention is aimed at improving and simplifying the task of measuring fiber orientation, particularly by eliminating the photographic step described above.

An object of this invention is to measure directly the variations in the intensities of the rings of a diffraction pattern by directing the diffraction pattern on the face of an X-ray counter and rotatively scanning the face of the X-ray counter.

One embodiment of this invention utilizes a pill-box type of Geiger counter on the face of which the diffraction pattern resulting from a beam of X-rays passed through a fiber bundle is directed. The face of the counter is masked by a pair of covers, one of which permits the passage of X-ray only through a circular slit on the face of the counter, and the other of which may be rotatable and has a radial slit which passes X-rays. By rotation of the latter cover, a concentric ring on the face of the counter can be scanned. By plotting the intensity of the radiation received against the angular displacement of the cover which has the radial slit a curve is obtained which directly represents the number of fiber Crystallites or chains per unit angular range.

Another embodiment of the invention employs the above described scanning means, but utilizes a scintillation counter in place of the pill-box counter.

A third modification of this invention employs a photomultiplier tube, on the face of which is disposed a small scintillation crystal adapted to be adjustably positioned at different radial distances from the center of the tube face. A second small scintillation crystal is positioned at the center of the face of the photomultiplier tube so that the axis of the X-ray beam and the resulting diffraction pattern can be aligned with that of the photomultiplier tube.

Other objects of this invention will become apparent from a consideration of the following detailed description when taken together with the accompanying drawings in which:

Fig. 1a is a schematic showing of the above described conventional method of determining fiber orientation illustrating a collimated X-ray beam passing through a fiber bundle to form a diffraction pattern on a photographic film;

Fig. 1b shows the diffraction pattern resulting from randomly oriented fibers as seen when the flat film of Fig. 1a is rotated 90°;

Fig. 2 is another diffraction pattern similar to Fig. 1b except that it is derived from a bundle of fibers highly oriented in one direction;

Fig. 3 is a curve representative of degree of fiber orientation;

Fig. 1a illustrates the known method of photographing the diffraction pattern of a bundle of fibers. An X-ray target is represented at 10 and collimator slits at 11. The collimated beam passes through a fiber bundle 12. The diffracted rays are then projected on a flat photographic film 13. Fig. 1b shows the diffraction pattern on the face of film 13 which is typical of randomly oriented fibers. Such a diffraction pattern comprises a series of concentric rings in which the intensities are uniform around the rings. The rings 14, 15 and 16 of Fig. 1b represent, for example, the three principle diffraction rings in a cellulose pattern.

When the fibers of the bundle 12 are highly oriented in one direction, the diffraction pattern will develop concentrations of intensity in directions bearing a definite relationship to the fiber axis. A pattern typical of oriented fibers may have the appearance of Fig. 2 in which the intensities of the diffraction rings are seen to vary in symmetrical fashion.

In using a diffraction pattern as shown in Fig. 2 to indicate fiber orientation it is the usual practice to employ microphotometer means to determine the density of blackening of the film around a diffraction ring. If the density be plotted against the angle to the fiber axis the resulting curve may look like that of Fig. 3. The density along the ring is directly related to the number of fiber Crystallites or chains per unit angular range.

Figure 4:
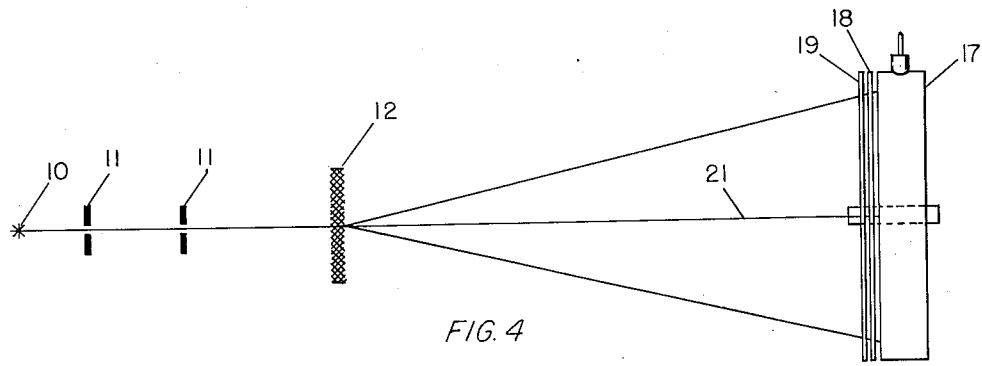
Fig. 4 is a side elevational view of a pill-box type of Geiger counter and a schematic showing of a diffraction pattern projected on the face thereof resulting from an X-ray beam passing through a fiber bundle.
Figure 5:
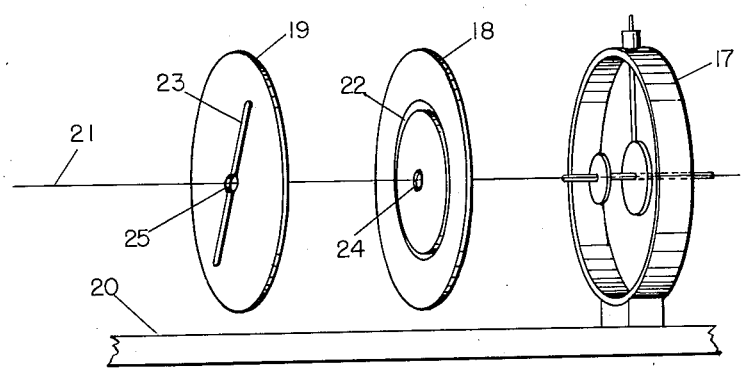
Fig. 5 is an exploded perspective view of the pill-box counter of Fig. 4 showing in detail the scanning means comprising a pair of covers having radial and circular slits respectively.

Fig. 4 represents one form of the present invention in which a pill-box type of Geiger counter 17 is substituted for the photographic film 13 of Fig. 1a. The pill-box counter 17 is provided with a pair of covers 18 and 19 shown in greater detail in the exploded view of Fig. 5. As shown in Fig. 5 the counter 17 is mounted on a track, represented at 20, running parallel to the primary X-ray axis 21. The mica window on the face of the counter 17 is masked by cover 18 so that only the ring defined by annular slit 22 will pass X-rays. For any given distance D, between the fiber 12 and the counter 17, the diffraction angle $\theta$ of radiation which passes through the slit 22 is given by the equation:

$$\tan \theta = R/D$$

Where R is the radius of the annular slit. If the counter 17 is moved toward the fiber bundle 12, $\theta$ increases. The value of D then determines which diffraction ring is projected on the face of the counter.

The cover disc 19 has a radial slit 23 therein. By rotating the cover disc 19 about the axis of the counter it is apparent that it is possible directly to map out an intensity curve corresponding to Fig. 3.

Central openings 24 and 25 in covers 18 and 19 permit the insertion of a hollow cylindrical shaft therethrough for rotation of the discs 18 and 19. Alignment of the pill-box counter is accomplished by sighting the collimated beam through the hollow cylindrical shaft by means of a fluorescent screen. The central opening provided by such a hollow cylindrical shaft may, and preferably would be blocked during the operation of scanning.

Figure 6:
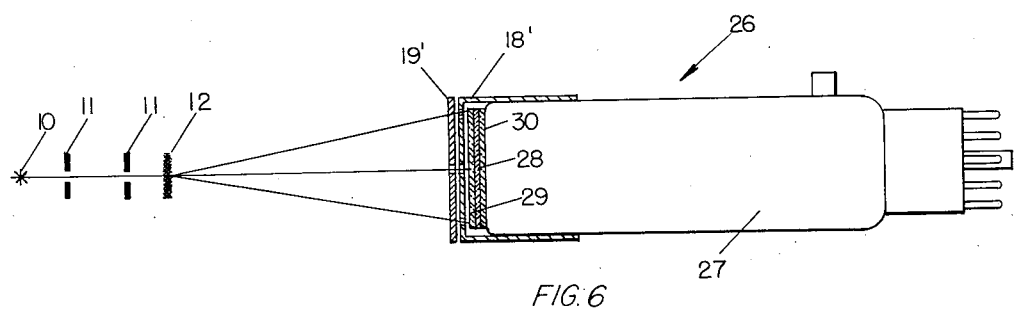
Fig. 6 is a view similar to Fig. 4 but showing in cross-section one form of a scintillation counter in place of the pill-box counter of Fig. 4.

Fig. 6 shows another modification of this invention in which the pill-box counter 17 of Figs. 4 and 5 is replaced by a scintillation counter 26. In Fig. 6 the scintillation counter comprises a photomultiplier tube 27 the face of which is covered by a fluorescent screen which takes the form of a scintillation crystal large enough to cover the face of the tube 27. The crystal itself may be of an inorganic substance, such as sodium iodide activated, for example, with thallium (NaI:T1). A layer of such material is shown at 28 in Fig. 6 sandwiched between a layer of beryllium or mica 29 and a layer of glass 30. A suitable thickness of beryllium for such a layer 29 would be 0.005" while 0.0005" would be a suitable thickness of mica. The layers 28, 29 and 30 are cemented together by some suitable cement which will optically join the layers. Optical coupling of the glass layer 30 to the face of the photomultiplier tube may be accomplished with an oil seal provided by a film of oil on the face of the tube 27.

The scintillation crystal 28 of Fig. 6, of course, becomes luminescent when subjected to X-rays and the degree of luminescence, and hence the intensity of radiations, are indicated by the output of the photomultiplier tube 27. Covers 18' and 19' are provided with circular and radial slits respectively, similar, therefore, to covers 18 and 19 of Figs. 4 and 5. A direct plot of the intensities of the diffraction rings projected on the face of scintillation counter 26 may obviously be obtained by rotating the entire device including photomultiplier tube 27, the luminescent face 28, 29, 30 and covers 18' and 19'. It will be equally apparent, however, as an alternative that the cover 19' only may be rotated. The same alternative methods of measuring the intensities of the diffraction rings in Figs. 4 and 5 are, of course, also available.

Alignment of the scintillation counter with respect to the collimated beam is accomplished by directing the beam through a small opening running axially through a shaft which may be provided for the rotating system. The aligned position of the scintillation counter is indicated when the maximum response of the counter is obtained for that position. The central aperture would preferably be blocked during scanning.

Figure 8:
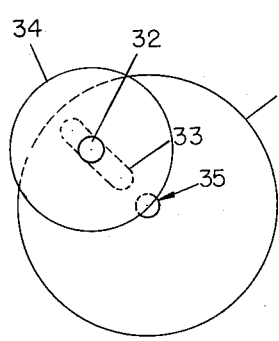
Fig. 8 is a view of the face of the counter shown in Fig. 7.
Figure 7:
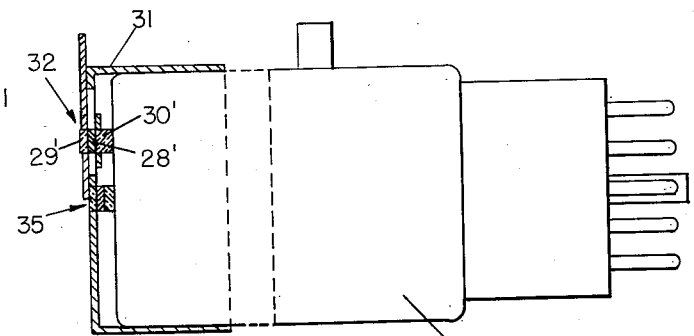
Fig. 7 is an enlarged cross-section of another type of counter comprising a photomultiplier tube and a small, radially adjustable scintillation crystal on the face of the tube.

A third embodiment of this invention is shown in Figs. 7 and 8. As shown in Fig. 7, the face of the photomultiplier tube 27 is shielded by a cover 31. A small scintillation crystal 32 is carried by the cover for radial adjustment in the radial slit 33 shown in Fig. 8. The small crystal 32 is in a capsule form in which the luminescent material 28' is hermetically sealed between layers of beryllium or mica 29' and glass 30' similar to the large crystal of Fig. 6. Optical contact of the crystal capsule 32 with the face of photomultiplier tube 27 is accomplished by an oil film on the face of the tube. Such a seal permits a sliding motion of the capsule on the face of the photomultiplier tube. Suitable means may be provided to retain the crystal capsule 32 in the radial slit 33 and yet permit radial adjustment. A light tight cover 34 of beryllium or aluminum for the slit 33 is also provided. A centrally positioned crystal capsule 35 is also located in optical contact with the face of photomultiplier tube 27. Figs. 7 and 8 show the capsule 35 supported by cover 31. The capsule 35 which is similar in construction and materials to capsule 32 is provided for the purpose of aligning the counter with the collimated beam. When the beam is directed against the crystal capsule 35 the maximum response of the counter indicates the proper alignment. As in the modifications of Figs. 5 and 6, the central beam would preferably be blocked during scanning as, for example, by providing a cover for the crystal capsule 35 during the scanning operation.

An advantage of the modification of Figs. 7 and 8 is that by the use of a small crystal there is a reduction in background "noise" from stray radiation. This follows as a matter of course due to the small area of the detector.

Figure 9:
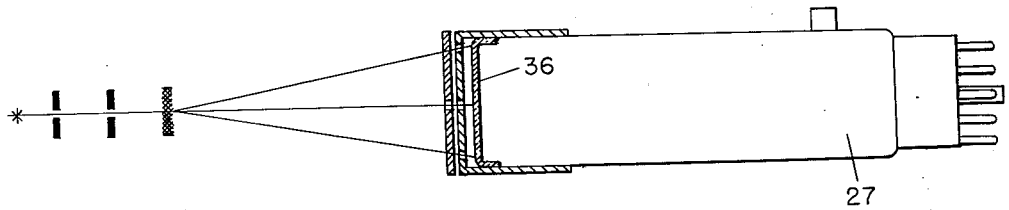
Figs. 9 and 10 are views similar to Fig. 6 but showing different forms of scintillation counters.
Figure 10:
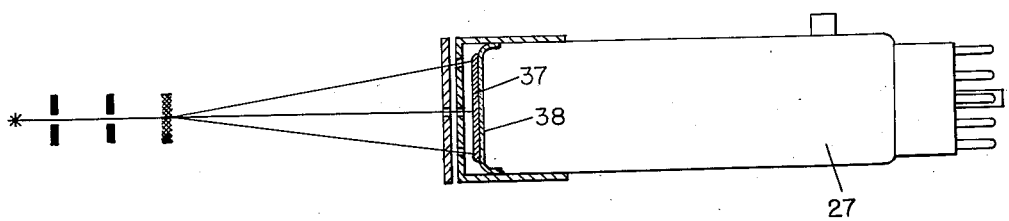

Figs. 9 and 10 are types of scintillation counters alternative to that shown in Fig. 6. In Fig. 9 the face 36 of the photomultiplier tube 27 is fluorescent glass. In Fig. 10 the face of the photomultiplier tube is coated with a fluorescent layer 37 which may take the form of a thin layer of microcrystals such as activated zinc sulphide, calcium tungstate or cadmium tungstate on the glass face 38 instead of the single large crystal of Fig. 6.

The disclosure contained in the drawing and specification is intended to describe the invention without being either limiting or exhaustive of the specific forms which the invention as covered by the appended claims may take. For example, the luminescent element in the modification embodying a photomultiplier may be a vessel containing a liquid such as a solution of terphenyl in xylene.

What is claimed is:

1. A device for measuring fiber diffraction patterns comprising, in combination, a source producing a beam of X-rays, a sample of fibrous material through which said beam is directed producing a diffraction pattern of X-rays, a radiation detector positioned on the side of said sample opposite from said source to detect the diffracted radiations in the plane of said diffraction pattern, and means to scan the intensities of selected diffraction rings of said diffraction pattern, said means admitting only a small area of diffracted X-rays in the plane of one of said rings to be detected by said detector, and said means progressively detecting the intensities of X-rays in said small areas along each of said diffraction rings.

2. An X-ray device for measuring fiber diffraction patterns comprising means producing a beam of X-rays, means to position material containing fibers having an axis of orientation in the path of said beam, a radiation detector positioned on the side of said sample opposite from said source so that its detecting face is in a plane perpendicular to the axis of said beam of X-rays and which plane will contain a diffraction pattern of X-rays passed through said material, and means to scan individually diffraction rings of said pattern with said radiation detector to determine the intensity of radiations along each said diffraction ring versus the angle of rotation about each said ring with respect to the said axis of orientation.

3. The device according to claim 2 in which means are provided adjustably to position the said radiation detector along the axis of said beam of X-rays.

4. The device according to claim 2 in which the means to scan individually diffraction rings of said diffraction pattern comprises a pair of covers for the face of the radiation detector, one of said covers having a slit radially disposed with respect to the axis of the beam of X-rays, and the other of said covers having a circular slit coaxial with said beam.

5. The device according to claim 4 in which the said radiation detector is a pill box type of Geiger counter.

6. The device according to claim 4 in which the radiation detector is a scintillation counter.

7. The device according to claim 2 in which said radiation detector is a scintillation counter.

8. The device according to claim 7 in which the scintillation counter comprises a photomultiplier tube having a small scintillation crystal in optical contact with the face thereof, and means providing for relative rotation between the scintillation counter and the diffraction pattern so that said small scintillation crystal traces the path of a diffraction ring of said pattern.

9. The device according to claim 8 in which means are provided to adjustably position the said small scintillation crystal radially with respect to the axis of said photomultiplier tube and said beam of X-rays.

10. The device according to claim 6 in which the said scintillation counter comprises a photomultiplier tube the face of which is substantially covered by a large scintillation crystal.

11. The device according to claim 6 in which the said scintillation counter comprises a photomultiplier tube having a face of fluorescent glass.

12. The device according to claim 6 in which the said scintillation counter comprises a photomultiplier tube, the face of which is substantially covered by a fluorescent screen of particles selected from the group consisting of zinc sulphide, calcium tungstate and cadmium tungstate.

13. The method of determining fiber orientation comprising directing a beam of X-rays through material containing fibers, positioning a radiation detector in a plane containing a diffraction pattern of the X-rays which have passed through said material, and scanning by means of said radiation detector selected diffraction rings of said diffraction pattern.

14. The method of determining fiber orientation comprising directing a beam of X-rays through material which contains fibers having an axis of orientation, positioning a radiation detector in a plane containing a diffraction pattern of the X-rays which have passed through said material, scanning by means of said radiation detector selected diffraction rings of said diffraction pattern, and noting the reading of said radiation detector indicating the intensity of radiations along each said diffraction ring versus the angle with respect to said axis of orientation.

15. The method of determining fiber orientation comprising directing a beam of X-rays through material containing fibers, positioning a radiation detector so that the face of said detector lies in a plane perpendicular to the axis of said beam and containing a diffraction pattern of the X-rays of said beam which have passed through said material, scanning individually with said radiation detector, diffraction rings of said diffraction pattern, and noting the reading of said detector during said scanning to determine the radiation intensities of small areas along each said diffraction ring versus the angles between the fiber axis planes, each of which contains the axis of said beam and passes through one of said small areas.

16. The method of determining fiber orientation comprising directing a beam of X-rays through material containing fibers, positioning a radiation detector so that the face of said detector lies in a plane perpendicular to the axis of said beam and containing a diffraction pattern of the X-rays of said beam which have passed through said material, scanning individually with said radiation detector diffraction rings of said diffraction pattern, and noting the reading of said detector during said scanning to determine the radiation intensities of diametrically opposite small areas along each said diffraction ring versus the angles between fiber axis and planes each containing the axis of said beam and passing through a pair of said diametrically opposite small areas.

References Cited in the file of this patent

UNITED STATES PATENTS 2,670,401    Weinberg _____ Feb. 23, 1954

OTHER REFERENCES

"Multichannel Collimators for Gamma-Ray Scanning With Scintillation Counters," by R. R. Newell et al., Nucleonics, July 1952, vol. 10, No. 7, pages 36 to 40.

"The Scanning X-ray Microscope," by Howard H. Pattee, Jr., Journal of the Optical Society of America, January 1953, vol. 43, pages 61 and 62.

"Sourcebook on Atomic Energy," by Glasstone, 1950 edition, D. Van Nostrand Co., Inc., New York, N. Y., sections 6.40 to 6.46, pages 140 to 142.